US012216099B2

(12) United States Patent
Ma (10) Patent No.: US 12,216,099 B2
(45) Date of Patent: Feb. 4, 2025

(54) DETECTION METHOD BASED ON SUPERCRITICAL FLUID CHROMATOGRAPHY AND POST-COLUMN IONIC LIQUID CHARGE COMPLEXATION

(71) Applicant: Chinese Academy of Inspection and Quarantine, Beijing (CN)

(72) Inventor: Qiang Ma, Beijing (CN)

(73) Assignee: Chinese Academy of Inspection and Quarantine, Beijing (CN)

( * ) Notice: Subject to any disclaimer, the term of this patent is extended or adjusted under 35 U.S.C. 154(b) by 492 days.

(21) Appl. No.: 17/666,721

(22) Filed: Feb. 8, 2022

(65) Prior Publication Data

US 2022/0229027 A1 Jul. 21, 2022

Related U.S. Application Data

(63) Continuation of application No. PCT/CN2021/070260, filed on Jan. 5, 2021.

(30) Foreign Application Priority Data

Feb. 10, 2020 (CN) .......................... 202010085113.1

(51) Int. Cl.
*B01D 11/02* (2006.01)
*B01D 15/40* (2006.01)
(Continued)

(52) U.S. Cl.
CPC ..... *G01N 30/7266* (2013.01); *B01D 11/0203* (2013.01); *B01D 15/40* (2013.01); *G01N 30/88* (2013.01)

(58) Field of Classification Search
CPC .... G01N 30/7266; G01N 30/88; G01N 30/84; G01N 2030/8441; G01N 2030/8452;
(Continued)

(56) References Cited

FOREIGN PATENT DOCUMENTS

CN 103197023 A 7/2013
CN 104297386 A 1/2015
(Continued)

OTHER PUBLICATIONS

Lu Zhao et al., Enantioseparation of chiral perfluorooctane sulfonate(PFOS) by supercritical fluid chromatography (SFC):Effects of the chromatographic conditions and separation mechanism, Chirality, 2019, 31: 870-878.
(Continued)

*Primary Examiner* — Pranav N Patel
(74) *Attorney, Agent, or Firm* — Locke Lord LLP; Tim Tingkang Xia, Esq.

(57) ABSTRACT

The invention discloses a detection method based on supercritical fluid chromatography (SFC) and post-column dicationic ionic liquid (DIL) charge complexation, which includes the following steps: (1) The supramolecular solvent (SUPRAS) was prepared by mixing heptanol, tetrahydrofuran, and water; (2) Sample pretreatment: the SUPRAS was used to extract the sample for subsequent analysis; (3) Analysis of perfluorinated compounds (PFCs) using SFC separation, post-column DIL-based charge complexation, and electrospray ionization-mass spectrometry (ESI-MS). The invention established a novel analytical method for the detection of PFCs in textiles incorporating post-chromatographic DIL-based charge complexation and SFC coupled with ESI-MS. The DIL reagent formed positively charged complexes with anionic analytes during the ESI process, facilitating MS detection in the positive ion mode with enhanced detection sensitivity.

4 Claims, 10 Drawing Sheets

(51) Int. Cl.
*G01N 30/72* (2006.01)
*G01N 30/88* (2006.01)

(58) Field of Classification Search
CPC .......... G01N 2030/8845; G01N 30/02; G01N 30/06; G01N 30/10; G01N 30/14; G01N 30/34; G01N 30/72; G01N 30/96; G01N 2030/062; G01N 2030/065; G01N 2030/067; G01N 2030/146; B01D 11/0203; B01D 15/40; B01D 11/0288
See application file for complete search history.

(56) References Cited

FOREIGN PATENT DOCUMENTS

| CN | 105241995 A | 1/2016 |
|---|---|---|
| CN | 107121487 A | 9/2017 |
| CN | 108318609 A | 7/2018 |
| CN | 108709947 A | 10/2018 |
| CN | 109507342 A | 3/2019 |
| CN | 111537623 A | 8/2020 |

OTHER PUBLICATIONS

Xiuli Lin et al., CE-ESI-MS analysis of singly charged inorganic and organic anions using a dicationic reagent as a complexing agent, Electrophoresis, 2009, 30, 3918-3925.

Guoping Li et al., Post-Chromatographic Dicationic Ionic Liquid-Based Charge Complexation for Highly Sensitive Analysis of Anionic Compounds by Ultra-High-Performance Supercritical Fluid Chromatography Coupled with Electrospray Ionization Mass Spectrometry, Anal. Chem., 2020, 93, 3, 1771-1778.

Yueguang Lv et al., Direct Mass Spectrometry Analysis Using In-Capillary Dicationic Ionic Liquid-Based in Situ Dispersive Liquid-Liquid Microextraction and Sonic-Spray Ionization, Anal. Chem., 2019, 91, 10, 6661-6668.

DETECTION METHOD BASED ON SUPERCRITICAL FLUID CHROMATOGRAPHY AND POST-COLUMN IONIC LIQUID CHARGE COMPLEXATION

CROSS-REFERENCE TO RELATED APPLICATION

This application is a continuation application of International Patent Application No. PCT/CN2021/070260, filed on Jan. 5, 2021, which itself claims priority to and benefit of Chinese Patent Application No. 202010085113.1 filed on Feb. 10, 2020 in the State Intellectual Property Office of P.R. China. The disclosure of each of the above applications is incorporated herein by reference in its entirety.

FIELD OF THE INVENTION

The present invention relates to the technical field of inspection and detection, and in particular relates to a detection method based on supercritical fluid chromatography (SFC) and post-column dicationic ionic liquid (DIL) charge complexation.

BACKGROUND OF THE INVENTION

Perfluorinated compounds (PFCs) are a class of organic compounds in which hydrogen atoms in hydrocarbons and their derivatives are replaced by fluorine atoms. PFCs are commonly used in household decorative paper, food packaging materials, and surfactants in fire-fighting foams. In textile manufacturing, PFCs are broadly used as finishing agents and surfactants. However, PFCs have a strong bioaccumulation effect. After entering organisms, PFCs will be distributed in serum and liver, resulting in a variety of toxic effects on organisms, such as liver toxicity, cardiovascular toxicity, developmental toxicity, immune system toxicity, endocrine disruption, and potential carcinogenicity.

Currently, solid-phase microextraction, ultrasonic extraction, and Soxhlet extraction have been reported for textile sample pretreatment. Nevertheless, these methods are not only time-consuming and use large amounts of organic solvents, but also have a negative impact on the environment and laboratory personnel. As nanostructured liquids, supramolecular solvents (SUPRASs) can improve the extraction efficiency of analytes, reduce extraction time, and consume less solvent. SUPRASs have progressively become a suitable green alternative to conventional organic solvents for sample pretreatment.

SUMMARY OF THE INVENTION

The technical problem to be solved in the present invention is to provide a detection method using SFC separation, post-column DIL-based charge complexation, and electrospray ionization-mass spectrometry (ESI-MS).

Compressed carbon dioxide is the primary mobile phase used in SFC, showing advantageous properties of lower cost, safety benefits, and environmental friendliness characteristics compared to organic solvents. Moreover, SFC is capable of achieving rapid and efficient separation with high reproducibility and reduction in consumption of organic solvents.

Negative-ion ESI-MS has been commonly used for the detection of PFCs. However, negative-ion ESI-MS is less sensitive compared to positive-ion ESI-MS. Room temperature ionic liquids are salts with melting points below 100° C. and have been regarded as promising green solvents because of the properties such as thermal stability, nonflammability, low viscosity, good electric conductivity, and tunable immiscibility. DILs are a novel class of ionic liquids consisting of a dication paired with two anions and can be used as post-column ion-pairing reagents for SFC.

The invention relates to a detection method based on SFC and post-column DIL charge complexation, which includes the following steps:

(1) The SUPRAS was prepared by mixing heptanol, tetrahydrofuran, and water;

(2) Sample pretreatment: the SUPRAS was used to extract the sample for subsequent analysis;

(3) Analysis of PFCs using supercritical fluid chromatography-mass spectrometry (SFC-MS).

According to the detection method based on SFC and post-column DIL charge complexation, the preparation of SUPRAS included the following steps: Aliquots of 3 mL of heptanol, 4 mL of tetrahydrofuran, and 33 mL of water were transferred into a 50-mL glass centrifuge tube, mixed for 3 min on a vortexer, and centrifuged at 3000 r/min for 10 min. The resulting SUPRAS supernatant was collected with a glass syringe and stored at 4° C.

According to the detection method based on SFC and post-column DIL charge complexation, the sample pretreatment process included the following steps: Aliquots of 0.50 g of samples were weighed in a 10-mL centrifuge tube, into which 4 mL of the obtained SUPRAS was then added. After vortexing for 3 min, the extract was centrifuged at 3000 r/min for 10 min. Aliquots of 100 µL supernatant portion was collected and diluted 1:1 (v/v) with methanol. The mixture was vortexed and filtered through a 0.22-µm microporous membrane prior to SFC-MS analysis.

According to the detection method based on SFC and post-column DIL charge complexation, the SFC-MS method used the following chromatographic conditions:

A Torus DIOL chromatographic column (2.1 mm×100 mm, 1.7 µm) was used. The binary mobile phase was composed of pressurized carbon dioxide (A) paired with 0.1% ammonia in methanol (B). The initial conditions were 5% B, and the linear elution gradient was then programmed from 5% B to 20% B within 8.9 min, and held for 0.1 min. At 9.5 min, the gradient was linearly returned to 5% B and maintained for 0.5 min to complete the whole run. The column temperature was set to 40° C. The flow rate was 0.3 mL/min. The automatic back pressure regulator (ABPR) pressure was set to 2000 psi. A sampling volume of 2 µL was injected. The flow rate of make-up solvent was 0.2 mL/min.

According to the detection method based on SFC and post-column DIL charge complexation, after SFC separation, a DIL (1,1'-dioctyl-4,4'-bipyridinium dibromide) was dissolved in the make-up solvent of SFC and introduced post-column but before the ESI source. The make-up solvent was a mixture of methanol and water at a ratio of 1:1 (v/v). The mass spectrometric parameters were set as follows:

The ESI source under positive ion mode enabled ionization of the analytes with a capillary voltage of 2.30 kV and a nitrogen desolvation gas of 150 L/hr at 350° C. A source temperature of 150° C., collision gas of 0.25 L/hr, and nitrogen cone gas at a flow rate of 150 L/hr were set for the experiments.

According to the detection method based on SFC and post-column DIL charge complexation, the PFCs analytes included perfluorododecanoic acid (PFDoDA), perfluorodo-decanoic acid (PFUnDA), perluorodecanoic acid (PFDA), perfluorononanoic acid (PFNA), perfluorooctanoate (PFOA), perfluoroheptanoic acid (PFHpA), perfluorohexanoic acid (PFHA), perfluoropentanoic acid (PFPA), perfluorooctane sulfonate (PFOS), and perfluorobutane sulfonate (PFBS).

TABLE 1

Chemical information for the 10 PFCs analytes

| PFCs | Molecular weight |
|---|---|
| PFDoDA | 613.9604 |
| PFUnDA | 563.9647 |
| PFDA | 513.9679 |
| PFNA | 463.9711 |
| PFOA | 413.9743 |
| PFHpA | 363.9774 |
| PFHA | 313.9806 |
| PFPA | 263.9838 |
| PFOS | 499.9380 |
| PFBS | 299.9508 |

The differences between the invention and current techniques are as follows:

The invention established an analytical method incorporating SFC separation, post-column DIL-based charge complexation and ESI-MS. The DIL reagent formed positively charged complexes with anionic target analytes during the ESI process, facilitating MS detection of the analytes in the positive ion mode with enhanced detection sensitivity. Moreover, the factors affecting the extraction yield of SUPRAS were optimized by single factor experiment and response surface methodology.

The invention incorporating SFC separation, post-column DIL-based charge complexation and ESI-MS is further explained in combination with the following attached figures.

BRIEF DESCRIPTION OF THE DRAWINGS

Additional objectives, functions, and advantages of the present invention will be set forth in the description of embodiments which follow, with reference to the accompanying drawings in which.

DETAILED DESCRIPTION OF THE INVENTION

1. Materials and Apparatus 1.1. Materials

Reference standards of perfluorododecanoic acid (PFDoDA), perfluoroundecanoic acid (PFUnDA), perluorodecanoic acid (PFDA), perfluorononanoic acid (PFNA), perfluorooctanoate (PFOA), perfluoroheptanoic acid (PFHpA), perfluorohexanoic acid (PFHA), perfluoropentanoic acid (PFPA), perfluorooctane sulfonate (PFOS), and perfluorobutane sulfonate (PFBS) were purchased from Sigma-Aldrich (St. Louis, MO, USA). 1,1'-Dimethyl-4,4'-bipyridinium dichloride, 4-aza-1-azoniabicyclo[2.2.2]octane, 1,1'-[1,4-phenylenebis(methylene)]bis(4,4'-bipyridinium) dibromide, 1,1'-diheptyl-4,4'-bipyridinium dibromide, and 1,1'-dioctyl-4,4'-bipyridinium dibromide were obtained from Sigma-Aldrich (St. Louis, MO, USA). Ultrapure water was produced using a Millipore Milli-Q Integral 5 water purification system (Bedford, MA, USA). Pentanol, hexanol, octanol, decanol, undecanol, and dodecanol were obtained from J&K Scientific Ltd. (Beijing, China). Heptanol and nonanol were purchased from Tokyo Chemical Industry Co., Ltd. (Tokyo, Japan).

1.2. Apparatus

ACQUITY UPC[2] system and Xevo TQ-S triple quadrupole mass spectrometer fitted with an ESI source and MassLynx version 4.1 software (Waters, Milford, MA, USA); AB204-S electronic balance (Mettler Toledo, Columbus, OH, USA); Hitachi CR 21N centrifuge (Tokyo, Japan); IKA MS3 vortexer (Staufen, Germany).

2. Detection Method

2.1. Preparation of SUPRAS

Aliquots of 3 mL of heptanol, 4 mL of tetrahydrofuran, and 33 mL of water were transferred into a 50-mL centrifuge tube, mixed for 3 min on a vortexer, and centrifuged at 3000 r/min for 10 min. The resulting SUPRAS supernatant was collected and stored at 4° C.

2.2. Sample Pretreatment

Aliquots of 0.50 g of samples were weighed in a 10-mL centrifuge tube, into which 4 mL of the obtained SUPRAS was then added. After vortexing for 3 min, the extract was centrifuged at 3000 r/min for 10 min. Aliquots of 100 μL supernatant portion was collected and diluted 1:1 (v/v) with methanol. The mixture was vortexed and filtered through a 0.22-μm microporous membrane prior to SFC-MS analysis.

2.3. SFC Conditions

A Torus DIOL chromatographic column (2.1 mm×100 mm, 1.7 μm) was used. The binary mobile phase was composed of pressurized carbon dioxide (A) paired with 0.1% ammonia in methanol (B). The initial conditions were 5% B, and the linear elution gradient was then programmed from 5% B to 20% B within 8.9 min, and held for 0.1 min. At 9.5 min, the gradient was linearly returned to 5% B and maintained for 0.5 min to complete the whole run. The column temperature was set to 40° C. The flow rate was 0.3 mL/min. The ABPR pressure was set to 2000 psi. A sampling volume of 2 μL was injected. The flow rate of make-up solvent was 0.2 mL/min.

2.4. Mass Spectrometric Conditions

After SFC separation, a DIL (1,1'-dioctyl-4,4'-bipyridinium dibromide) was dissolved in the make-up solvent of SFC and introduced post-column but before the ESI source. The make-up solvent was a mixture of methanol and water at a ratio of 1:1 (v/v). The mass spectrometric parameters were set as follows:

The ESI source under positive ion mode enabled ionization of the analytes with a capillary voltage of 2.30 kV and a nitrogen desolvation gas of 150 L/hr at 350° C. A source temperature of 150° C., collision gas of 0.25 L/hr, and nitrogen cone gas at a flow rate of 150 L/hr were set for the experiments.

Figure 4A:
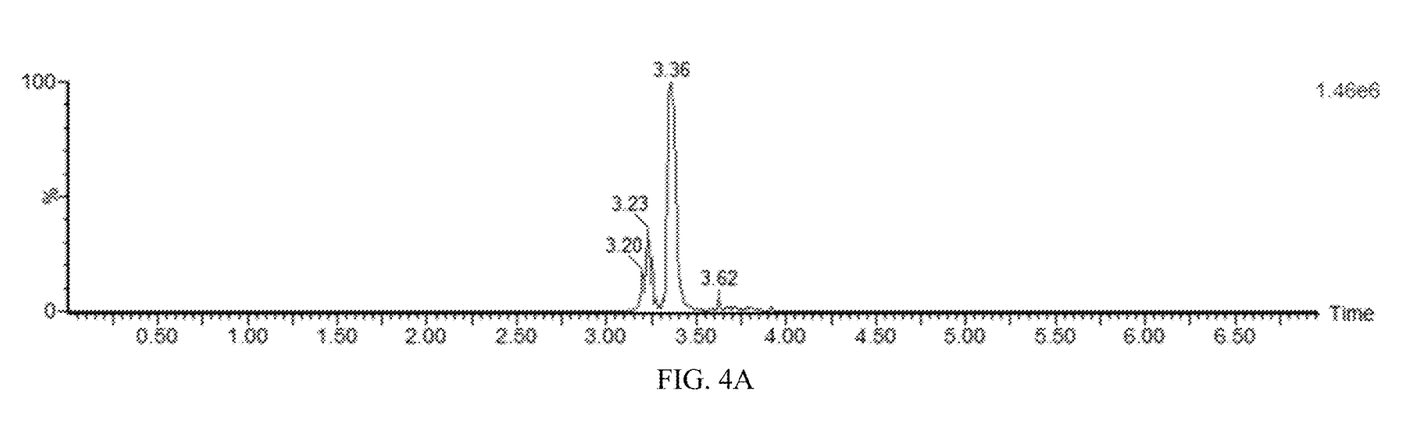
FIG. 4A is a total ion current chromatogram for the analysis of the 10 PFCs in the negative ion mode without post-column addition of DIL.
Figure 4B:
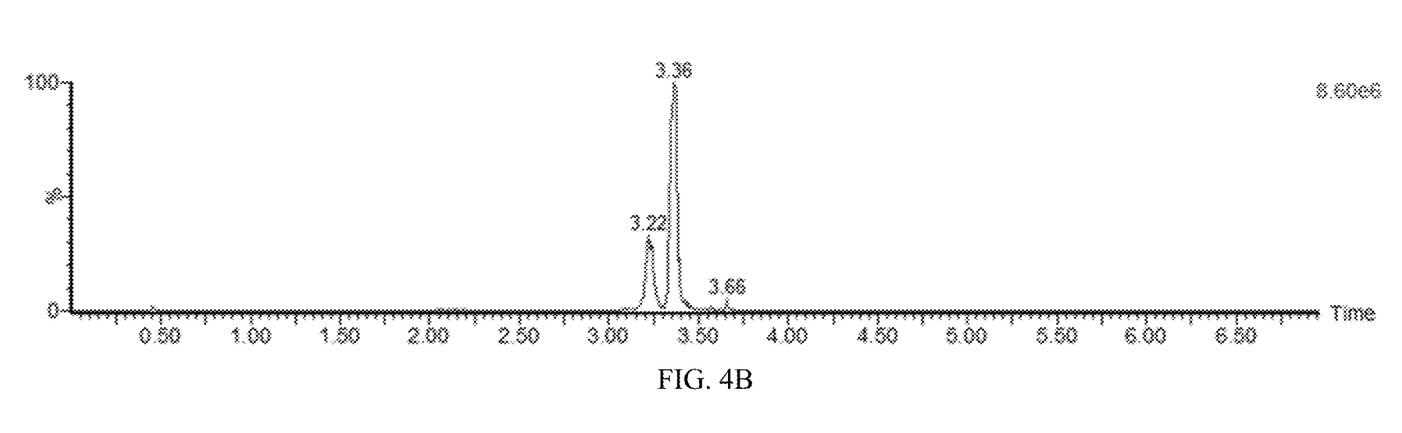
FIG. 4B is a total ion current chromatogram for the analysis of the 10 PFCs in the positive ion mode with post-column addition of DIL.
Figure 4C:
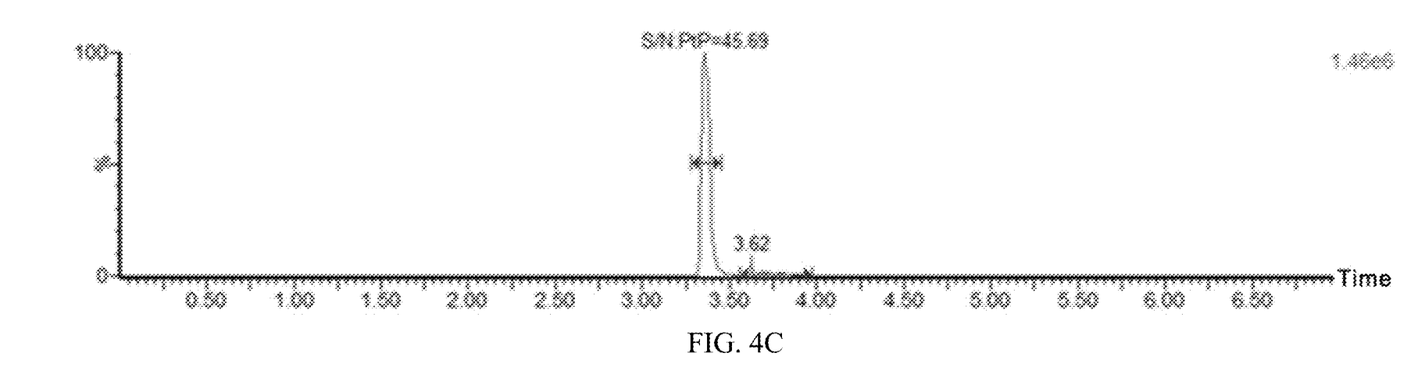
FIG. 4C is a multiple reaction monitoring chromatogram of PFBS in the negative ion mode without post-column addition of DIL.
Figure 4D:
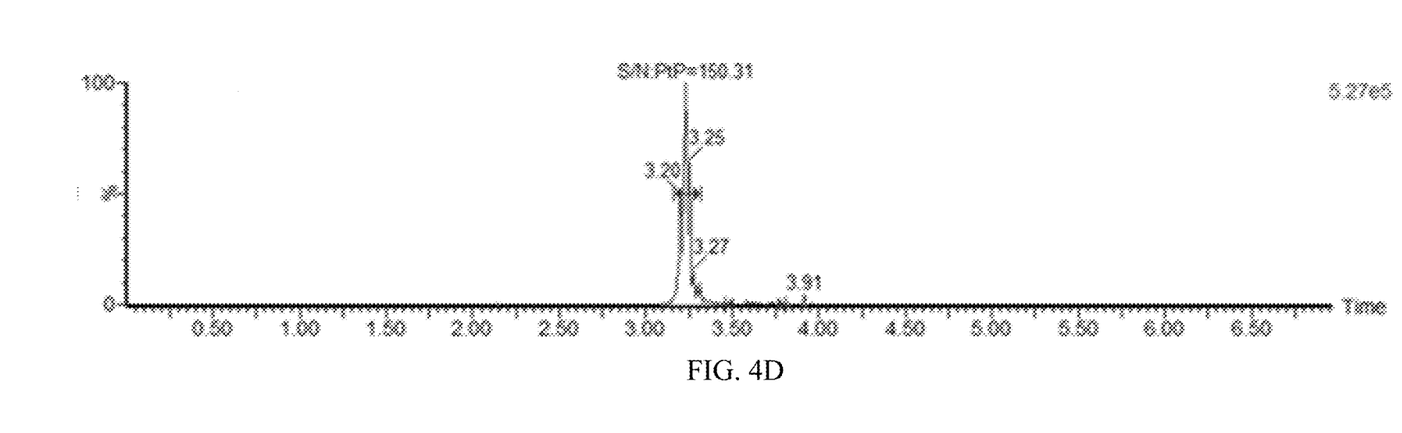
FIG. 4D is a multiple reaction monitoring chromatogram of PFOS in the negative ion mode without post-column addition of DIL.
Figure 4E:
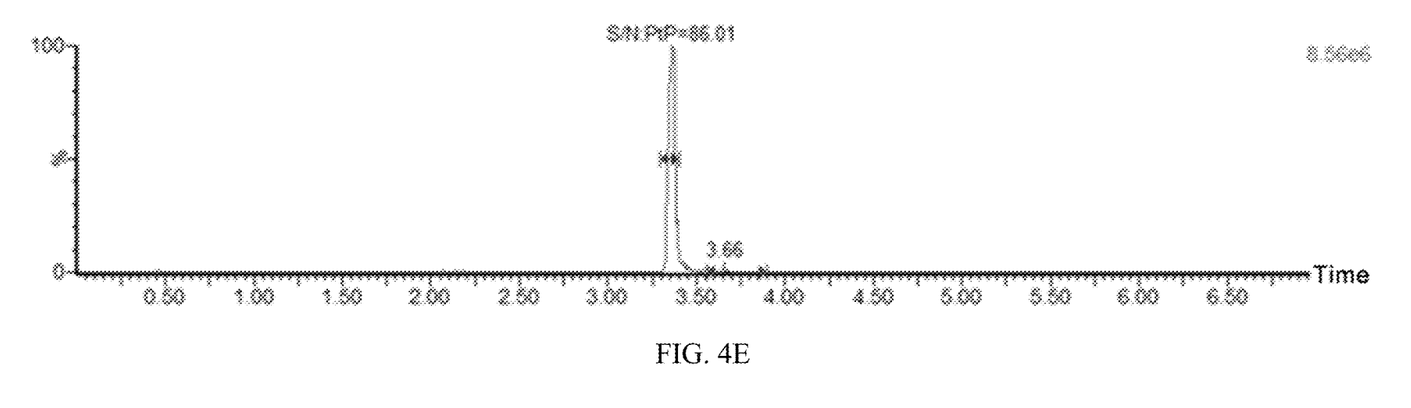
FIG. 4E is a multiple reaction monitoring chromatogram of PFBS in the positive ion mode with post-column addition of DIL.
Figure 4F:
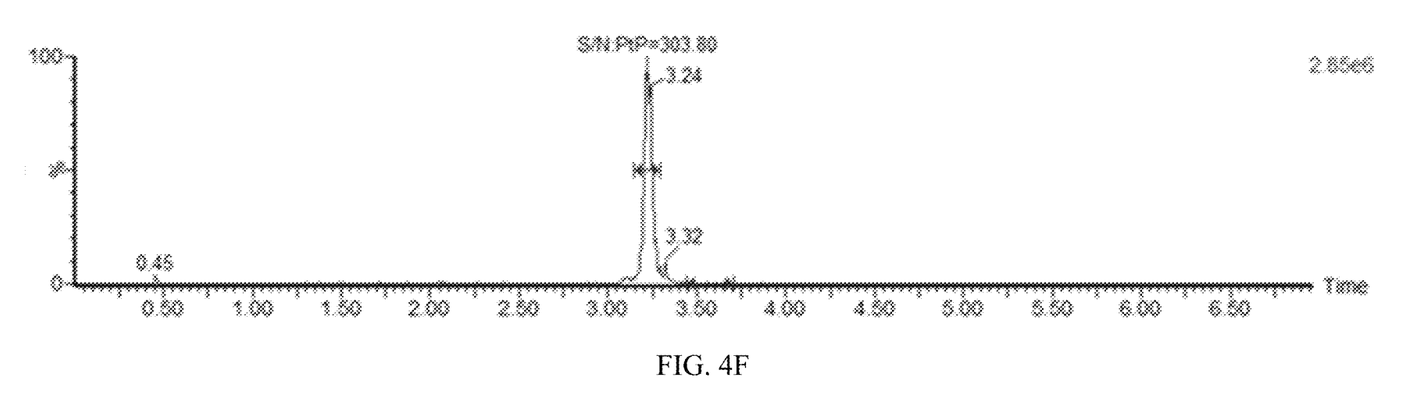
FIG. 4F is a multiple reaction monitoring chromatogram of PFOS in the positive ion mode with post-column addition of DIL.

FIG. 4A is a total ion current chromatogram for the analysis of the 10 PFCs in the negative ion mode without post-column addition of DIL. FIG. 4B is a total ion current chromatogram for the analysis of the 10 PFCs in the positive ion mode with post-column addition of DIL. FIG. 4C is a multiple reaction monitoring chromatogram of PFBS in the negative ion mode without post-column addition of DIL. FIG. 4D is a multiple reaction monitoring chromatogram of PFOS in the negative ion mode without post-column addition of DIL. FIG. 4E is a multiple reaction monitoring chromatogram of PFBS in the positive ion mode with post-column addition of DIL. FIG. 4F is a multiple reaction monitoring chromatogram of PFOS in the positive ion mode with post-column addition of DIL. The multiple reaction monitoring (MRM) chromatograms shown in FIG. 4C, FIG. 4D, FIG. 4E and FIG. 4F were obtained for the detection of PFBS and PFOS at 10 ng/mL using 2.5 μM dissolved in methanol/water mixture solution (1:1, v/v) at a flow rate of 1.5 mL/min. Significant enhancement in S/N and signal intensity was achieved in the positive ionization mode compared to the negative ionization mode. Moreover, the peak shape of the analytes at low concentrations in the negative ion mode could easily be distorted due to the unstable ionization. However, the peak shape in the positive ion mode was much better.

2.5. Comparative MS Test in the Negative Ion Mode

The ESI source under positive ion mode enabled ionization of the analytes with a capillary voltage of 2.30 kV and a nitrogen desolvation gas of 150 L/hr at 350° C. A source temperature of 150° C., collision gas of 0.25 L/hr, and nitrogen cone gas at a flow rate of 150 L/hr were set for the experiments.

The precursor and product ions, cone voltage, and collision energy for the analysis of the 10 PFCs are shown in Table 2.

TABLE 2

The precursor ion, product ion, cone voltage and collision energy for the analysis of the 10 PFCs.

| No. | PFCs | Precursor ion (m/z) | Product ion (m/z) | Cone voltage (V) | Collision energy (V) |
|-----|--------|-------|-------|----|----|
| 1 | PFDoDA | 613.1 | 569.0 | 10 | 10 |
| 2 | PFUnDA | 563.1 | 519.0 | 2 | 10 |
| 3 | PFDA | 513.0 | 469.0 | 22 | 10 |
| 4 | PFNA | 463.1 | 419.1 | 14 | 10 |
| 5 | PFOA | 413.0 | 369.0 | 21 | 10 |
| 6 | PFHpA | 363.1 | 319.0 | 10 | 10 |
| 7 | PFHA | 313.0 | 269.0 | 10 | 8 |
| 8 | PFPA | 263.1 | 219.1 | 10 | 8 |
| 9 | PFOS | 499.0 | 80.0 | 26 | 36 |
| 10 | PFBS | 299.0 | 80.0 | 36 | 30 |

Figures 3A, 3B, 3C, 3D:
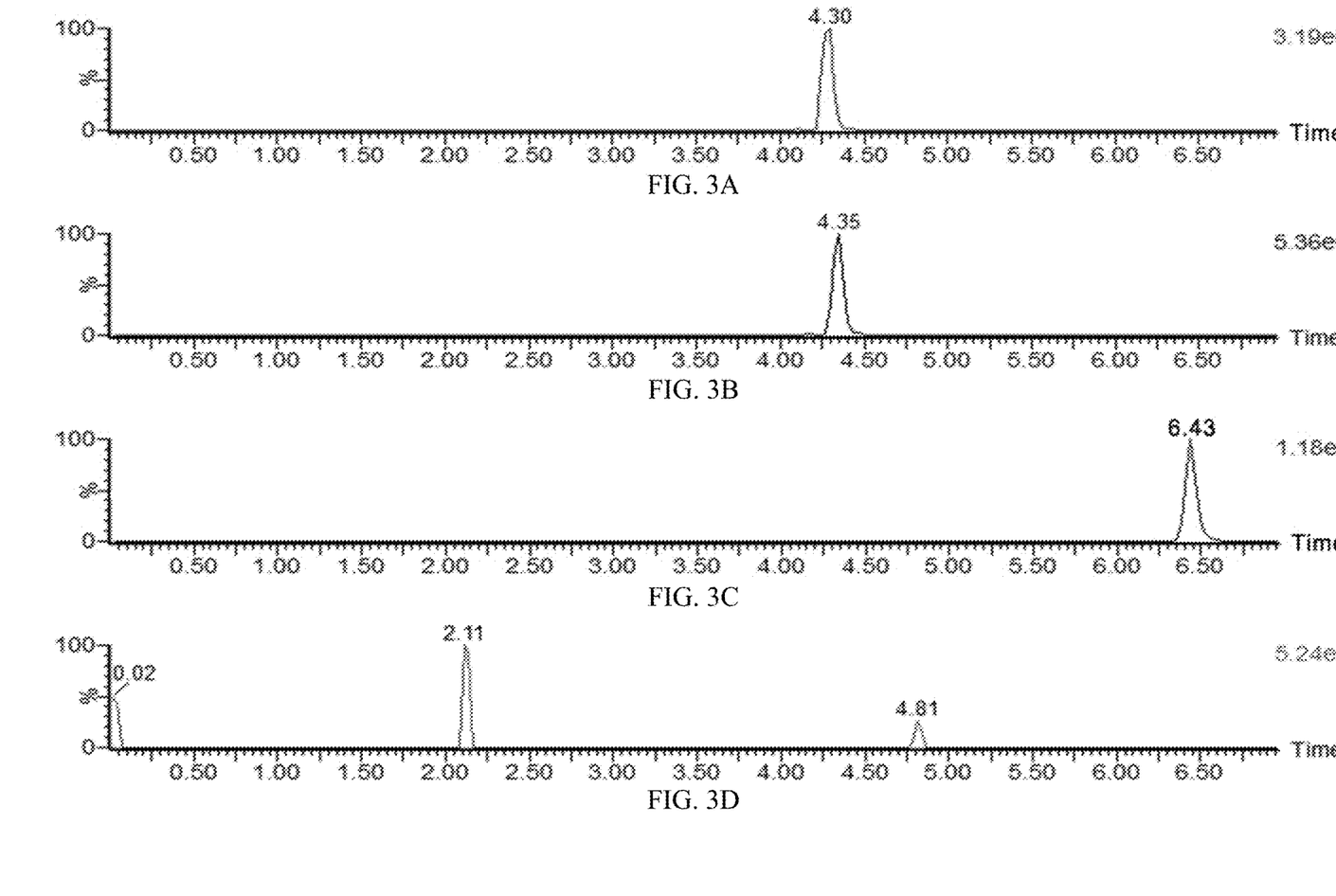
FIG. 3A is a multiple reaction monitoring (MRM) chromatogram of PFDoDA in the positive ion mode.
FIG. 3B is a MRM chromatogram of PFUnDA in the positive ion mode.
FIG. 3C is a MRM chromatogram of PFOS in the positive ion mode.
FIG. 3D is a MRM chromatogram of PFBS in the positive ion mode.
Figure 3E:
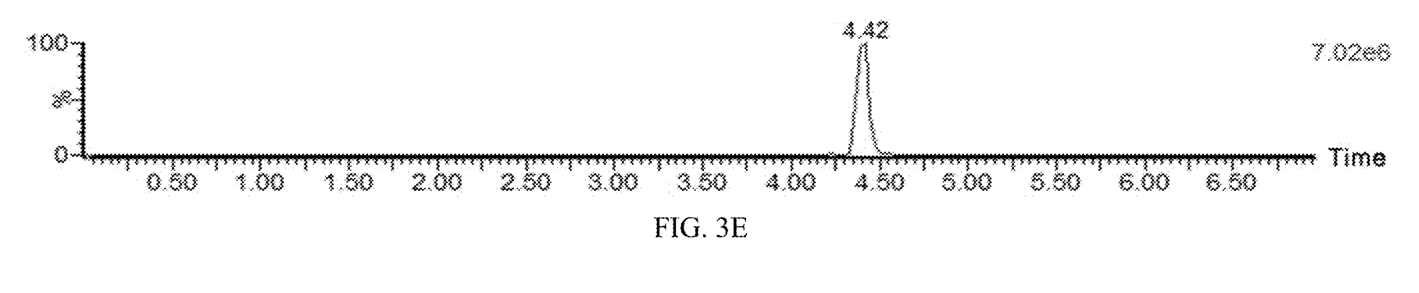
FIG. 3E is a MRM chromatogram of PFDA in the positive ion mode.
Figure 3F:
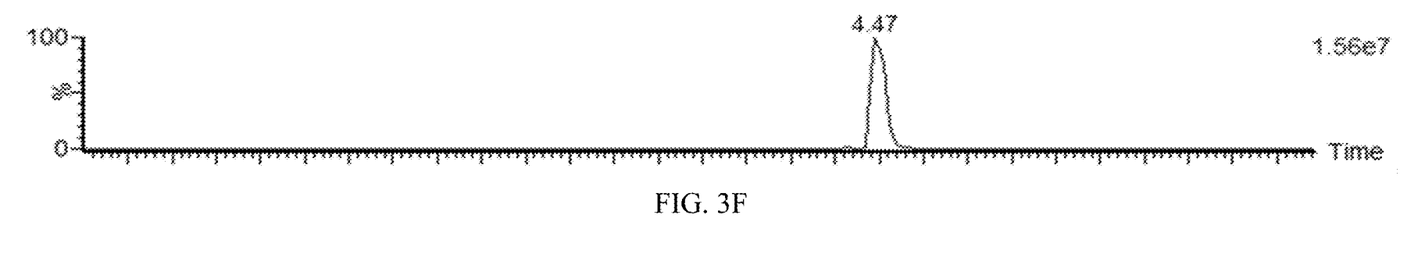
FIG. 3F is a MRM chromatogram of PFNA in the positive ion mode.
Figure 3G:
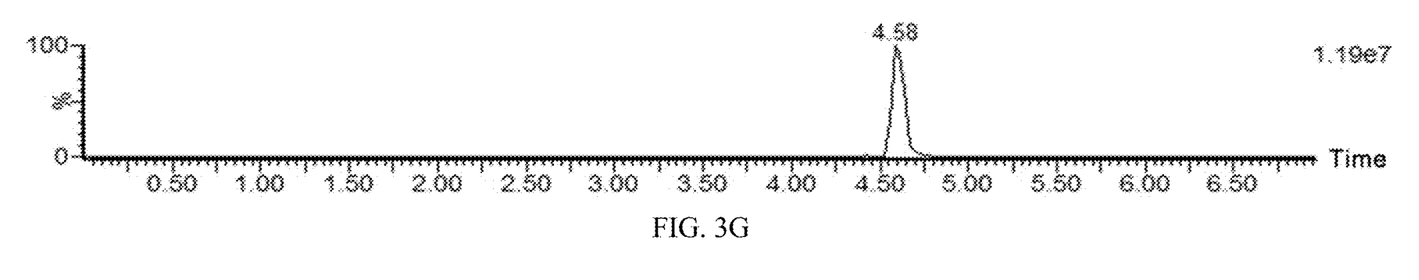
FIG. 3G is a MRM chromatogram of PFOA in the positive ion mode.
Figure 3H:
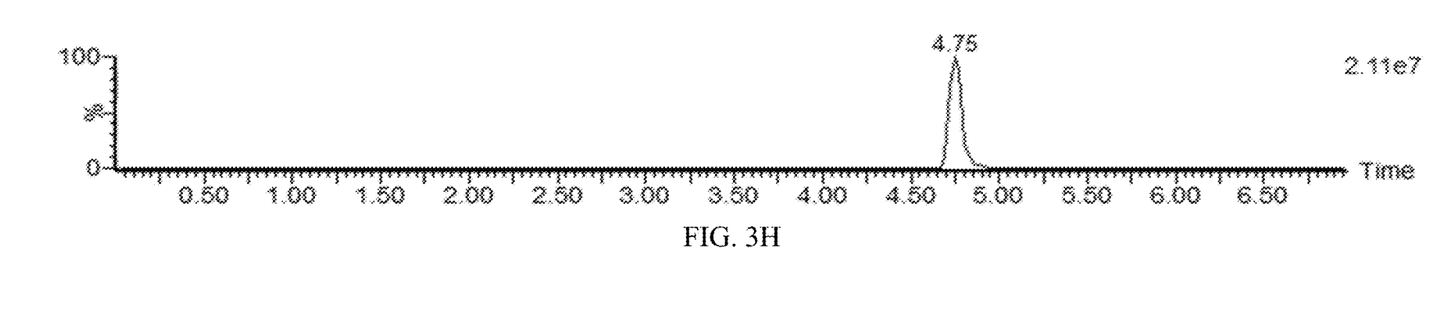
FIG. 3H is a MRM chromatogram of PFHpA in the positive ion mode.
Figure 3I:
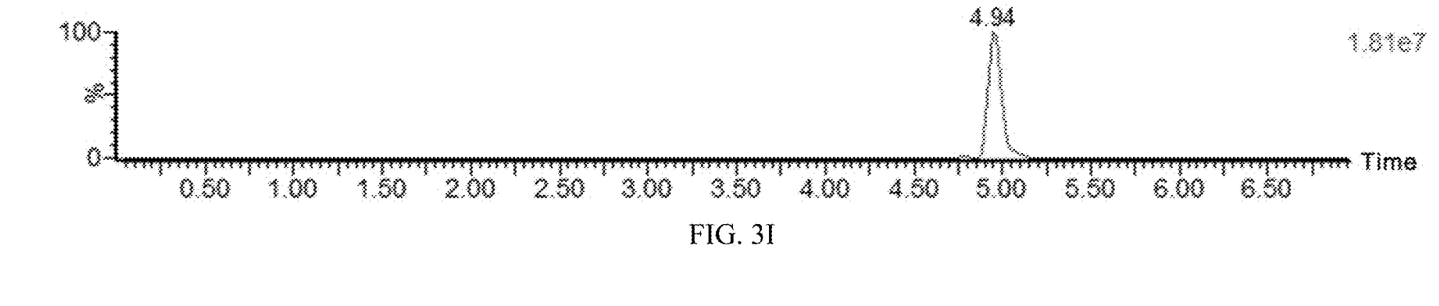
FIG. 3I is a MRM chromatogram of PFHA in the positive ion mode.
Figure 3J:
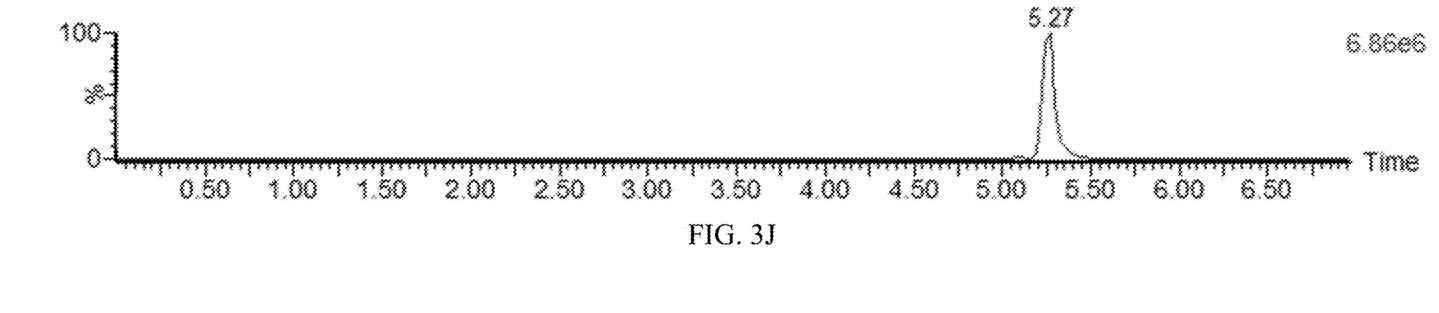
FIG. 3J is a MRM chromatogram of PFPA in the positive ion mode.

FIG. 3A is a multiple reaction monitoring chromatogram of PFDoDA in the positive ion mode. FIG. 3B is a multiple reaction monitoring chromatogram of PFUnDA in the positive ion mode. FIG. 3C is a multiple reaction monitoring chromatogram of PFOS in the positive ion mode. FIG. 3D is a multiple reaction monitoring chromatogram of PFBS in the positive ion mode. FIG. 3E is a multiple reaction monitoring chromatogram of PFDA in the positive ion mode. FIG. 3F is a multiple reaction monitoring chromatogram of PFNA in the positive ion mode. FIG. 3G is a multiple reaction monitoring chromatogram of PFOA in the positive ion mode. FIG. 3H is a multiple reaction monitoring chromatogram of PFHpA in the positive ion mode. FIG. 3I is a multiple reaction monitoring chromatogram of PFHA in the positive ion mode. FIG. 3J is a multiple reaction monitoring chromatogram of PFPA in the positive ion mode.

3. Results and Discussion

3.1. Optimization of SUPRAS-Based Extraction with Single Factor Test

3.1.1. Optimization of Type and Amount for Alkyl Alcohols

Figure 1A:
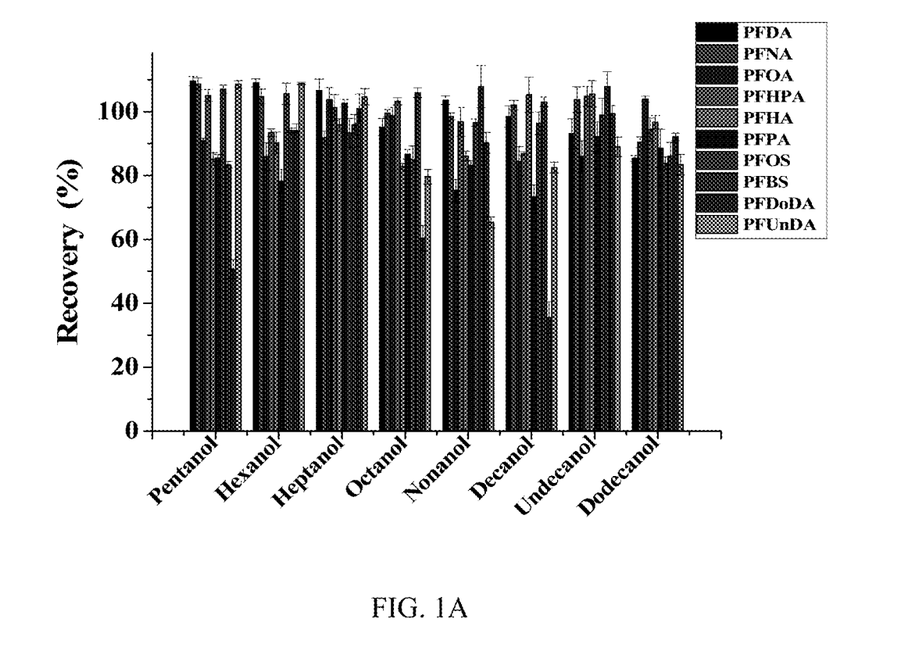
FIG. 1A is a schematic diagram of the effect of alkyl alcohol type on extraction yield.
Figure 1B:
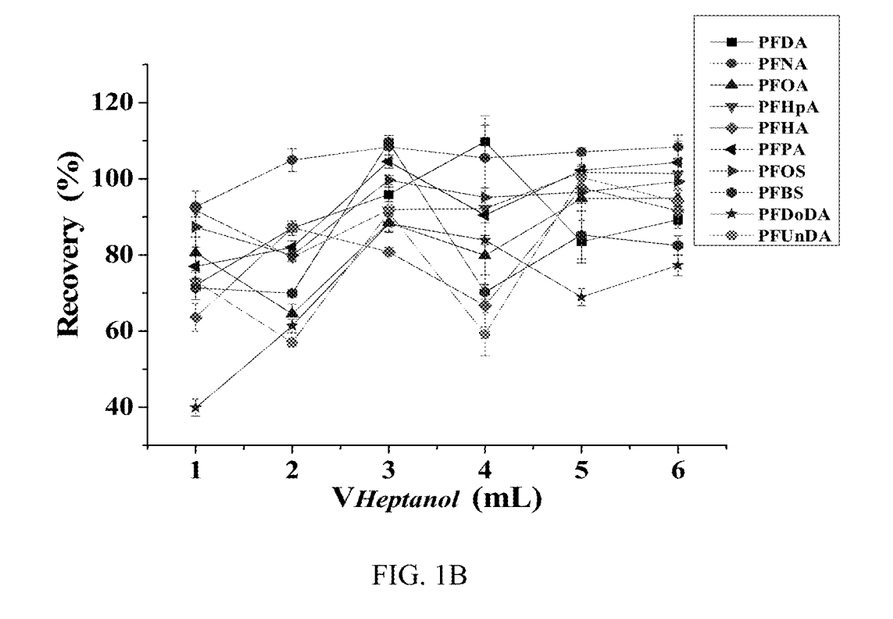
FIG. 1B is a schematic diagram of the effect of amount of heptanol on extraction yield.

A variety of alkyl alcohols with different carbon numbers (each of pentanol, hexanol, heptanol, octanol, nonanol, decanol, undecanol, and dodecanol) were mixed with tetrahydrofuran and water to form SUPRAS for the extraction of PFCs in textiles. As shown in FIG. 1A, the extraction recovery of PFCs in heptanol/tetrahydrofuran/water system was 91-106%, and the recovery was relatively stable. Thus, heptanol was selected as the best suited among the alkyl alcohols investigated. The amount of heptanol (1-6 mL) was also evaluated. Maintaining fixed volumes of 40 mL of SUPRAS, the extraction yield increased with increasing amount of heptanol from 1 to 3 mL but decreased thereafter (FIG. 1B). Thus, 3 mL was selected as an optimum volume for heptanol.

3.1.2. Optimization of Amount for Tetrahydrofuran

Figure 1C:
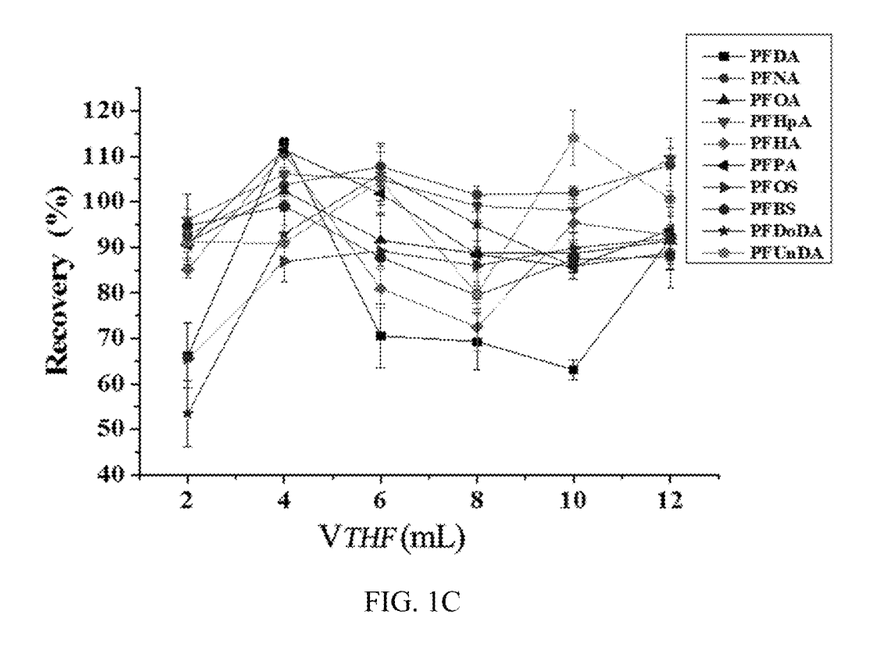
FIG. 1C is a schematic diagram of the effect of amount of tetrahydrofuran on extraction yield.

The extraction effect was assessed using a total of 40 mL of SUPRAS containing 2, 4, 6, 8, 10, or 12 mL of tetrahydrofuran (heptanol was kept at 3 mL), among which 4 mL gave the maximum and stable extraction yield. With the increase of tetrahydrofuran, the extraction yield of most compounds first decreased and then basically became stable (FIG. 1C).

3.1.3. Optimization of Vortex Time

Figure 1D:
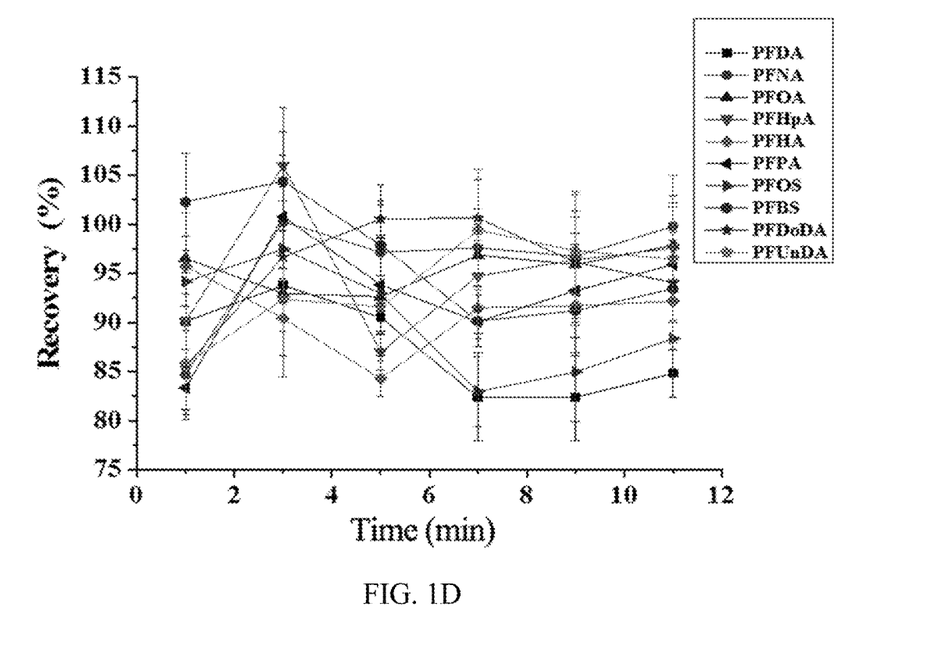
FIG. 1D is a schematic diagram of the effect of vortex time on extraction yield.

The extraction yield of six vortex times (1, 3, 5, 7, 9, and 11 min) were evaluated. It was found that the vortex time of 3 min reached a maximum extraction yield for the 10 PFCs. With the increase of vortex time, the extraction yield tended to be stable. Therefore, 3 min was chosen for further studies. FIG. 1D is a schematic diagram of the effect of vortex time on extraction yield.

3.1.4. Optimization of SUPRAS Volume

After the composition of SUPRAS was determined, the extraction efficiency of different volumes of SUPRAS (2, 3, 4, 5, and 6 mL) was further studied. The experimental results demonstrated that the extraction yield first increased and then gradually stabilized, with 4 mL being the optimal volume of SUPRAS.

3.2. Optimization of SUPRAS-Based Extraction by Response Surface Methodology

Figure 2A:
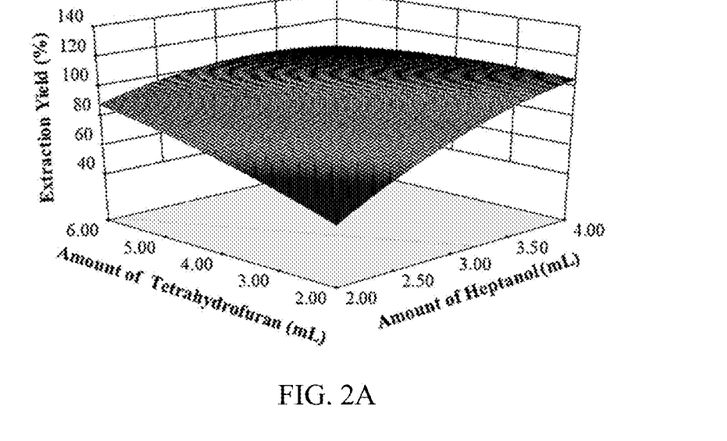
FIG. 2A is a response surface plot of amounts of tetrahydrofuran and heptanol.
Figure 2B:
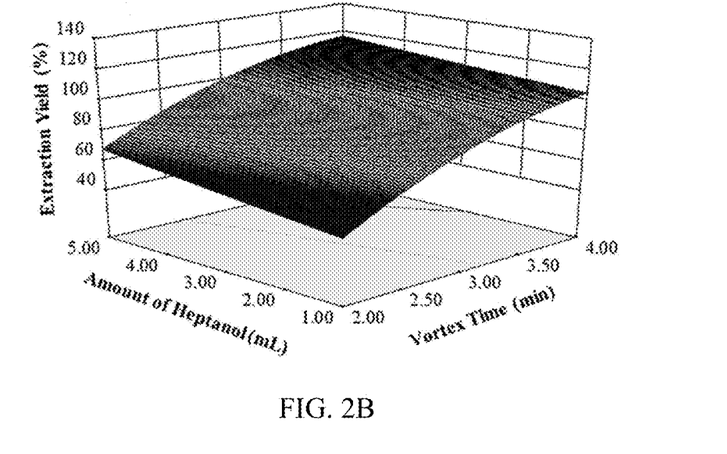
FIG. 2B is a response surface plot of vortex time and amount of heptanol.
Figure 2C:
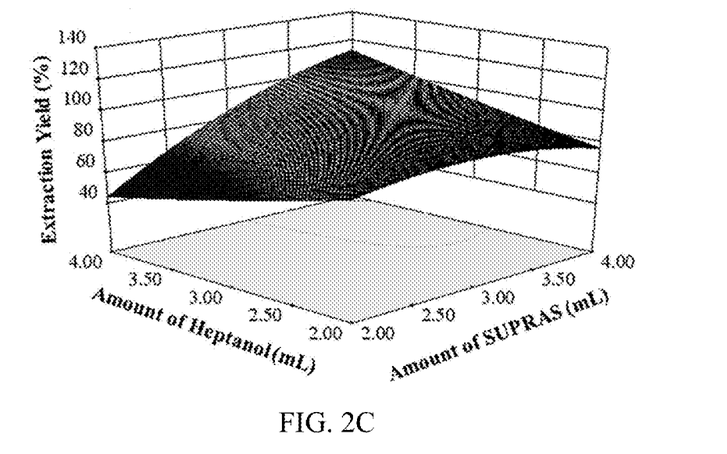
FIG. 2C is a response surface plot of amounts of heptanol and SUPRAS.
Figure 2D:
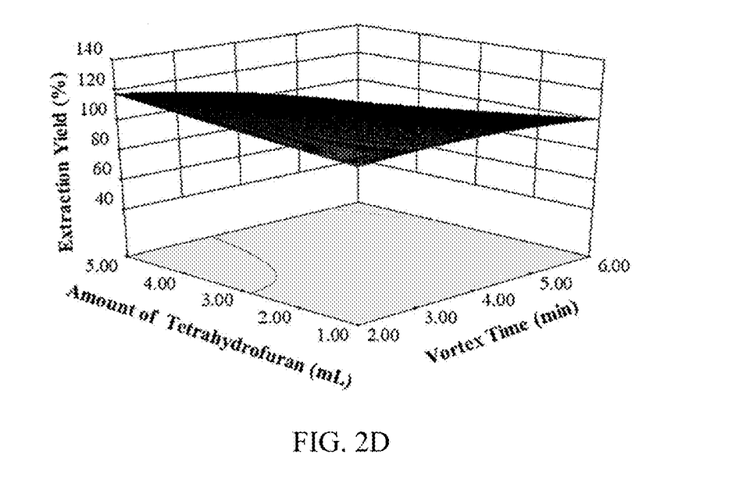
FIG. 2D is a response surface plot of vortex time and amount of tetrahydrofuran.
Figure 2E:
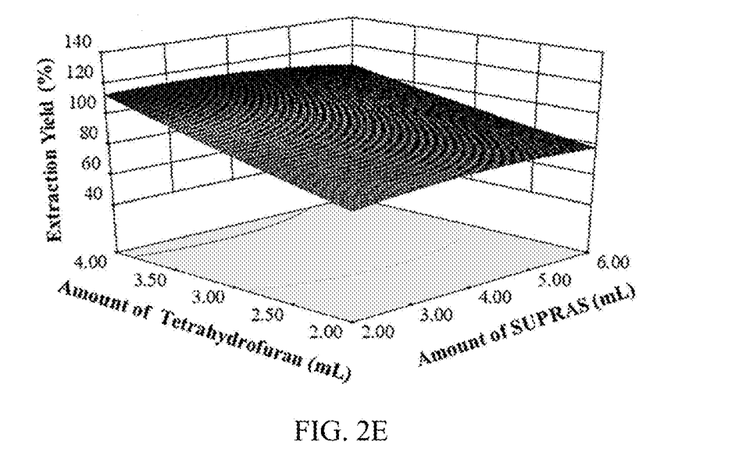
FIG. 2E is a response surface plot of amounts of tetrahydrofuran and SUPRAS.
Figure 2F:
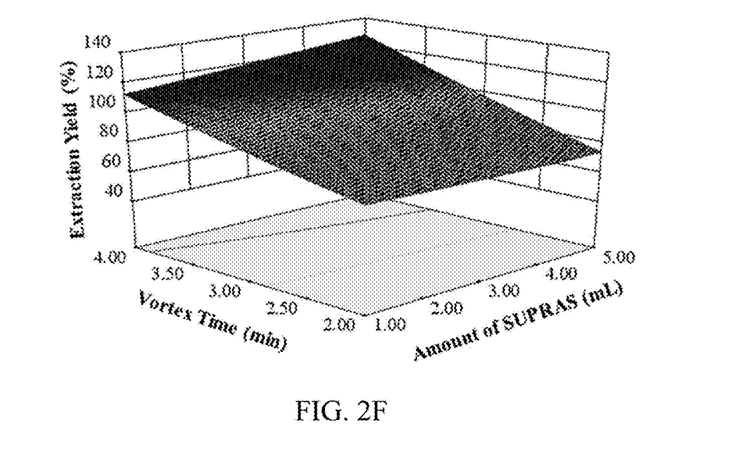
FIG. 2F is a response surface plot of vortex time and amount of SUPRAS.

According to the single factor test results, a comprehensive analysis of four critical variables (amounts of heptanol, tetrahydrofuran, SUPRAS, and vortex time) was carried out to examine their influences on extraction efficiency for PFCs. The interaction between the variables was analyzed using the four-factor and three-level response surface methodology. According to multiple regression analyses of the data processing with coded levels (Table 3), analysis of variance (ANOVA) of the fitted quadratic polynomial model identified a p value less than 0.0001, indicating that the regression model was of significance. The calculated lack-of-fit value was 0.2985, exhibiting that the model could sufficiently predict relevant variation while representing the actual relationship between the four variables. FIG. 2A is a response surface plot of amounts of tetrahydrofuran and heptanol. FIG. 2B is a response surface plot of vortex time and amount of heptanol. FIG. 2C is a response surface plot of amounts of heptanol and SUPRAS. FIG. 2D is a response surface plot of vortex time and amount of tetrahydrofuran. FIG. 2E is a response surface plot of amounts of tetrahydrofuran and SUPRAS. FIG. 2F is a response surface plot of vortex time and amount of SUPRAS. The results indicated that interaction between the amounts of heptanol and tetrahydrofuran (AB), interaction between the amount of heptanol and vortex time (AC), and interaction between the amounts of heptanol and SUPRAS (AD) were significantly correlated with the extraction yield of the 10 PFCs.

TABLE 3

ANOVA results for the response surface quadratic model.

| Source | Degrees of freedom | Sum of squares | Mean square | F-value | P-value | |
|---|---|---|---|---|---|---|
| Model | 14 | 3266.21 | 233.30 | 58.47 | <0.0001 | significant |
| A | 1 | 238.90 | 238.90 | 59.87 | <0.0001 | |
| B | 1 | 484.57 | 484.57 | 121.44 | <0.0001 | |
| C | 1 | 224.44 | 224.44 | 56.25 | <0.0001 | |
| D | 1 | 33.77 | 33.77 | 8.46 | <0.0001 | |
| AB | 1 | 660.73 | 660.73 | 165.59 | 0.0114 | |
| AC | 1 | 173.14 | 173.14 | 43.39 | <0.0001 | |
| AD | 1 | 1054.68 | 1054.68 | 264.33 | <0.0001 | |
| BC | 1 | 42.60 | 42.60 | 10.68 | <0.0001 | |
| BD | 1 | 47.97 | 47.97 | 12.02 | 0.0056 | |
| CD | 1 | 55.19 | 55.19 | 13.83 | 0.0038 | |
| A2 | 1 | 2.41 | 2.41 | 0.60 | 0.0023 | |
| B2 | 1 | 46.21 | 46.21 | 11.58 | 0.4499 | |
| C2 | 1 | 193.48 | 193.48 | 48.49 | 0.0043 | |
| D2 | 1 | 38.30 | 38.30 | 9.60 | <0.0001 | |
| Residual | 14 | 55.86 | 3.99 | | 0.0079 | |
| Lack of fit | 10 | 45.74 | 4.57 | 1.81 | 0.2985 | not significant |
| Pure error | 4 | 10.12 | 2.53 | | | |

3.3. Model Validation

The optimal extraction conditions obtained by response surface methodology were as follows: 4 mL of heptanol, 4 mL of tetrahydrofuran, 3 mL of SUPRAS, and 1 min of vortex time. In order to confirm the accuracy of the established model, the process was repeated three times to extract PFCs under optimal condition. The experimental results under this condition were 106.337%, 108.599%, and 107.840%, with an average value of 107.592%. The relative error between experimental value and predicted value (108.105%) was 0.474%. Thus, the extraction conditions of PFCs optimized by response surface methodology are feasible and reliable.

3.4. Optimization of DILs 3.4.1. Optimization of Type for DILs

The DIL acted as the derivatization reagent for the post-column adducts. The chromatographic effluent was combined post-column with a make-up solvent containing a DIL reagent, leading to the detection of positively charged complexes in the positive ion mode. The DILs of 1,1'-dimethyl-4,4-bipyridinium dichloride, 4-aza-1-azoniabicyclo[2.2.2] octane, 1,1'-[1,4-phenylenebis(methylene)]bis(4,4'-bipyridinium) dibromide, 1,1'-diheptyl-4,4'-bipyridinium dibromide, and 1,1'-dioctyl-4,4'-bipyridinium dibromide were investigated for their ability to pair with PFCs. Among the five DILs investigated, 1,1'-dioctyl-4,4'-bipyridinium dibromide was identified as the most effective, and the total signal intensity and detection sensitivity of the 10 PFCs were the highest. Therefore, 1,1'-dioctyl-4,4'-bipyridinium dibromide was used in the make-up solvent. The dissolving solvent, concentration, and flow rate were optimized.

3.4.1. Optimization of Solvent Type and Ratio for DILs

Two make-up solvents (acetonitrile and methanol) for dissolving the DIL were evaluated. However, it was found that the baseline was too high. The solvent was then changed to a mixture of methanol/acetonitrile and water with the ratios of 1:1, 2:3, 4:1, 3:2, and 1:4. Based on the comparison in terms of response intensity and S/N value, the best results were achieved using a mixture of methanol and water at a ratio of 1:1 (v/v).

3.4.2. Optimization of DIL Concentration

The concentration of 1,1'-dioctyl-4,4'-bipyridinium dibromide (20, 15, 10, 5, 4, 3, 2, 1, 0.8, and 0.6 μM) was optimized, among which the most intense signal intensity and S/N value were obtained at a concentration of 2.5 μM.

3.4.3. Optimization of DIL Flow Rate

Maintaining a fixed concentration of 2.5 μM for 1,1'-dioctyl-4,4'-bipyridinium dibromide and methanol-water 1:1 (v/v) as the make-up solvent, the flow rate of the make-up solvent was then optimized in the range of 1-2.5 mL/min. It was observed that the maximum signal intensity and best peak shape were obtained at a flow rate of 1.5 mL/min.

3.5. Analysis of Real Samples

The proposed approach was applied to the analysis of real textile samples of different fabrics (e.g., nylon, cotton, polyester and silk). The experimental results revealed that the 10 PFCs were not detected.

The foregoing embodiments are merely illustrative of preferred embodiments of the present invention and are not intended to limit the scope of the present invention. Various variations and modifications made to the technical solutions of the present invention by those skilled in the art without departing from the spirit of the present invention are embraced in the protection scope of the present invention as defined by the appended claims.

What is claimed is:

1. A detection method based on supercritical fluid chromatography (SFC) and post-column dicationic ionic liquid (DIL) charge complexation, which includes the following steps:
    preparing a supramolecular solvent (SUPRAS) by mixing heptanol, tetrahydrofuran, and water;
    performing sample pretreatment to extract samples by the SUPRAS and to obtain a test solution for subsequent analysis, wherein the samples are textiles;
    performing an analysis of perfluorinated compounds (PFCs) in the test solution using SFC separation, post-column DIL-based charge complexation, and electrospray ionization-mass spectrometry (ESI-MS), wherein the DIL is 1,1'-dioctyl-4,4'-bipyridinium dibromide;
    wherein the chromatographic conditions are as follows:
    a DIOL chromatographic column (2.1 mm×100 mm, 1.7 μm) is used, a binary mobile phase is composed of pressurized carbon dioxide (A) paired with 0.1% ammonia in methanol (B), initial conditions are 5% B, and a linear elution gradient is then programmed from 5% B to 20% B within 8.9 min, and held for 0.1 min, at 9.5 min, the gradient is linearly returned to 5% B and maintained for 0.5 min to complete a whole run, a column temperature is set to 40° C., a flow rate is 0.3 mL/min, an automatic back pressure regulator (ABPR) pressure is set to 2000 psi, a sampling volume of 2 μL of the test solution is injected, and a flow rate of a make-up solvent was 0.2 mL/min, wherein the make-up solvent was a mixture of methanol and water at a ratio of 1:1 (v/v);
    after the SFC separation, the DIL is dissolved in the make-up solvent of SFC and introduced post-column but before an ESI source;
    wherein—the PFCs include perfluorododecanoic acid (PFDoDA), perfluoroundecanoic acid (PFUnDA), perfluorodecanoic acid (PFDA), perfluorononanoic acid (PFNA), perfluorooctanoate (PFOA), perfluoroheptanoic acid (PFHpA), perfluorohexanoic acid (PFHA), perfluoropentanoic acid (PFPA), perfluorooctane sulfonate (PFOS), and perfluorobutane sulfonate (PFBS).

2. The detection method of claim 1, wherein the preparation of the SUPRAS includes the following steps:
    transferring aliquots of 3 mL of heptanol, 4 mL of tetrahydrofuran, and 33 mL of water into a 50-mL glass centrifuge tube,
    mixing the heptanol, the tetrahydrofuran and the water in the glass centrifuge tube for 3 min on a vortexer, and
    centrifuging the glass centrifuge tube at 3000 r/min for 10 min,
    wherein the resulting SUPRAS supernatant is collected with a glass syringe and stored at 4° C.

3. The detection method of claim 1, wherein the sample pretreatment process includes the following steps:
    disposing aliquots of 0.50 g of the samples in a 10-mL centrifuge tube,
    adding 4 mL of the obtained SUPRAS into the centrifuge tube,
    vortexing the centrifuge tube for 3 min,
    centrifuging the extract in the centrifuge tube at 3000 r/min for 10 min,
    collecting aliquots of 100 μL supernatant portion and diluting the collected supernatant portion 1:1 (v/v) with methanol to form a mixture, and
    vortexing the mixture, and filtering the vortexed mixture through a 0.22-μm microporous membrane to obtain the test solution prior to SFC-mass spectrometry analysis.

4. The detection method of claim 1,
    wherein a concentration of the 1,1'-dioctyl-4,4'-bipyridinium dibromide is 2.5 μM, and a flow rate of the 1,1'-dioctyl-4,4'-bipyridinium dibromide is 1.5 mL/min;
    wherein the mass spectrometric parameters are set as follows:
    the ESI source under positive ion mode enabled ionization of analytes with a capillary voltage of 2.30 kV and a nitrogen desolvation gas of 150 L/hr at 350° C., a source temperature of 150° C., collision gas of 0.25 L/hr, and nitrogen cone gas at a flow rate of 150 L/hr are set for experiments.

* * * * *